Sept. 15, 1925.                                                1,554,018
T. MIDGLEY
TIRE MOLD
Filed Aug. 31, 1923
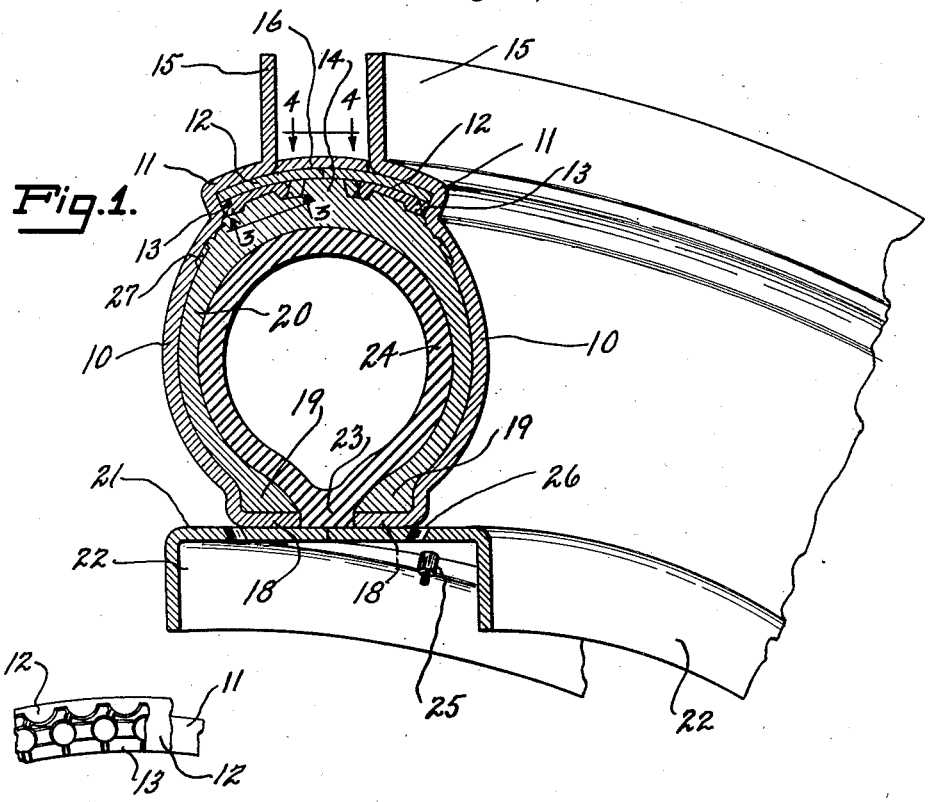
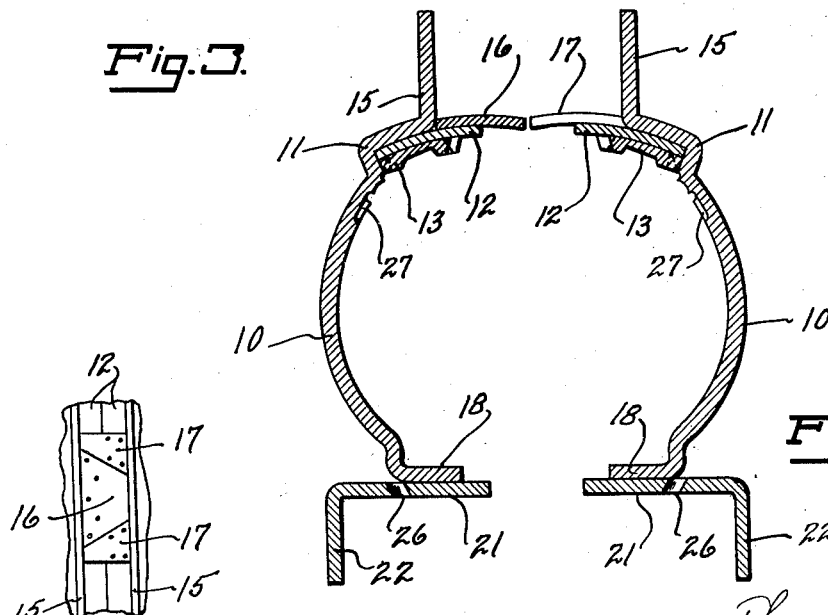
INVENTOR.
Thomas Midgley
BY
Edward Naylor
ATTORNEY.

Patented Sept. 15, 1925.

1,554,018

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed August 31, 1923. Serial No. 660,297.

*To all whom it may concern:*

Be it known that I, THOMAS MIDGLEY, a citizen of the United States of America, residing at Hampden, in the county of Hampden and State of Massachusetts, have invented certain new and useful Improvements in a Tire Mold, of which the following is a specification.

The present invention relates to tire molds adapted to be constructed out of sheet metal and particularly intended for use in the vulcanization of automobile tire casings under internal fluid pressure. This invention is in the nature of a modification of the molds shown and described in my copending applications Serial Nos. 659,813 and 660,296, filed Aug. 28, 1923, and Aug. 31, 1923, respectively. The invention will now be described in connection with the accompanying drawings, in which—

Fig. 1 is a sectional perspective view of a mold embodying the invention;

Fig. 2 is a sectional view with the parts separated;

Fig. 3 is a detail, partly broken away, looking on line 3—3 of Fig. 1; and

Fig. 4 is a detail looking on line 4—4 of Fig. 1.

The mold comprises side plates 10 suitably shaped to the transverse curvature of the tire to be produced and provided with shoulder portions 11 forming recesses for the reception of other parts to be described. Lying in these recesses, and extending so as to meet at the central plane of the assembled mold, are cover plates 12 defining, when the mold is being used, the outermost surface of the tire being molded. Also lying within the recesses, but terminating short of the central plane of the mold so as to form together with the cover plates a central recess which will form a circumferential rib 14 upon the tire, are tread forming strips 13, preferably perforated and treated in accordance with the disclosure in my prior application No. 659,813 referred to above so as to form molding cavities terminating at cover plates 12 and designed to produce the desired molded tread pattern on the tire. The cover plates and tread forming strips are preferably secured permanently in the recess in the side plates, as by spot welding, so that the two mold halves will function as units.

The side plates extend beyond the recesses substantially parallel to the plane of the mold so as to form flanges 15 which, as is shown in Fig. 1, are parallel to each other and capable of being used as abutments against which a prying tool may be applied to assist in separating the molds after the vulcanization of a tire therein. To accurately register the mold halves together, so that the tread pattern produced on the tire casing will be symmetrical, interengaging plates 16 and 17 (Fig. 4) are attached respectively to the two cover plates. Preferably a series of these interengaging plates are provided around the periphery of the mold.

The inner portions of the side plates are bent toward the central plane of the mold, as indicated at 18, underlying the bead portions 19 of the tire casing 20 and preferably terminating short of the central plane of the mold. Secured to the flanges 18, preferably by spot welding, are annular plates 21 having flanges 22 thereon serving as supports for the several molds when these are stacked in vertical formation in a heater. These plates bridge the gap between the flanges 18 so as to receive the base portion 23 of the annular fluid bag 24 by which pressure is transmitted to the tire casing during vulcanization. The stem 25 of this bag passes through suitable notches in the plates 21, as indicated in Fig. 1. In order to provide drainage of any condensed moisture, a series of holes 26 are preferably provided in plates 21 near the juncture point of these plates with the side plates 10.

The method of producing the tread design in this mold is similar to that set forth in my copending application No. 659,813 referred to except that instead of forming the apertures, which are to constitute the molding cavities, directly in the side plates these are formed in the tread forming strips 13. In this respect the mold is similar to that described in my copending application Serial No. 660,296, filed concurrently herewith. If desired, a continuation of the mold design may be formed at 27 on the side plates 10.

Having thus described my invention, I claim:

1. A mold adapted for use in the vulcanization of tire casings and constructed in mating annular halves, each half comprising a side plate curved to give the desired form to a side portion of the tire and extending outwardly in a flange serving together with a similar flange on the other mold half to assist in the separation of the mold halves, a tread forming strip shaped to impart the desired tread design to the tire, said strip terminating short of the central plane of the assembled mold, a cover plate overlying the tread forming strip and extending to the central plane of the mold, said strip and cover plate lying in a depression in the side plate and being permanently secured thereto; and interfitting members secured respectively to the two mold halves and adapted to cause proper registration thereof when assembled.

2. A mold adapted for use in the vulcanization of tire casings and constructed in mating annular halves, each half comprising a side plate curved to give the desired form to a side portion of the tire, and extending outwardly in a flange serving together with a similar flange on the other mold half to assist in the separation of the mold halves, a tread forming strip shaped to impart the desired tread design to the tire, said strip terminating short of the central plane of the assembled mold, a cover plate overlying the tread forming strip and extending to the central plane of the mold, said strip and cover plate lying in a depression in the side plate and being permanently secured thereto.

3. A mold adapted for use in the vulcanization of tire casings and constructed in mating annular halves, each half comprising a side plate curved to give the desired form to a side portion of the tire, a tread forming strip shaped to impart the desired tread design to the tire, said strip terminating short of the central plane of the assembled mold, a cover plate overlying the tread forming strip and extending to the central plane of the mold, said strip and cover plate lying in a depression in the side plate and being permanently secured thereto.

4. A mold adapted for use in the vulcanization of tire casings and constructed in mating annular halves, each half comprising a sheet metal side plate curved to conform to the tire and having a shouldered recess, and a tread forming member permanently located in said recess.

THOMAS MIDGLEY.